(12) United States Patent
Otsuki

(10) Patent No.: US 10,146,201 B2
(45) Date of Patent: Dec. 4, 2018

(54) NUMERICAL CONTROL APPARATUS, NUMERICAL CONTROL METHOD AND COMPUTER PROGRAM FOR CONTROLLING MACHINE TOOL

(71) Applicant: FANUC CORPORATION, Yamanashi (JP)

(72) Inventor: Hideki Otsuki, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 166 days.

(21) Appl. No.: 15/379,485

(22) Filed: Dec. 15, 2016

(65) Prior Publication Data

US 2017/0185061 A1    Jun. 29, 2017

(30) Foreign Application Priority Data

Dec. 24, 2015 (JP) ................................. 2015-251175

(51) Int. Cl.
*G05B 19/12* (2006.01)

(52) U.S. Cl.
CPC .... *G05B 19/12* (2013.01); *G05B 2219/24163* (2013.01); *G05B 2219/35194* (2013.01)

(58) Field of Classification Search
CPC .......... G06F 21/23; G06F 21/00; G06F 21/44; G05B 19/12
See application file for complete search history.

(56) References Cited

U.S. PATENT DOCUMENTS

| 2006/0156025 A1* | 7/2006 | Shibui | G05B 19/409 713/183 |
| 2007/0150089 A1* | 6/2007 | Dolansky | G05B 19/128 700/173 |
| 2014/0364989 A1* | 12/2014 | Hosaka | G05B 19/41825 700/159 |

FOREIGN PATENT DOCUMENTS

| JP | 2-83709 A | 3/1990 |
| JP | 3-91808 A | 4/1991 |
| JP | 4-211808 A | 8/1992 |
| JP | 5-313720 A | 11/1993 |
| JP | H7-276187 A | 10/1995 |
| JP | 9-212221 A | 8/1997 |
| JP | 2005-149226 A | 6/2005 |
| JP | 2007-21656 A | 2/2007 |
| JP | 2009-86964 A | 4/2009 |
| JP | 2015-197684 A | 11/2015 |

* cited by examiner

*Primary Examiner* — Michael J Brown
(74) *Attorney, Agent, or Firm* — Hauptman Ham, LLP

(57) ABSTRACT

A numerical control apparatus which enables a numerical control apparatus for a machine tool suitable for executing a particular machining program to selectively execute the machining program. The numerical control apparatus includes a storage that stores unique information; a receiving part that receives a machining program including incidental information; a determination part that checks the incidental information included in the machining program received by the receiving part with the unique information stored in the storage, and determines whether information matching the unique information is included in the incidental information; and a machine controller that executes the machining program received by the receiving part to control the machine tool only when it is determined that information matching the unique information is included in the incidental information.

8 Claims, 9 Drawing Sheets

FIG. 3

```
                    Machining program
O1;
G01X100.Y100.Z100.F3000.S1000;
G01 · · ·
              ┌─────────────────────────────────┐
              │      Incidental information     │
              │   (Identifier: INCIDENTAL)      │
              ├─────────────────────────────────┤
              │       CNC-1. INCIDENTAL1        │
              │       CNC-2. INCIDENTAL1        │
              │       MTA-1. INCIDENTAL2        │
              │       MTA-2. INCIDENTAL2        │
              └─────────────────────────────────┘
```

FIG. 5

```
                  Machining program
O1;
G01X100.Y100.Z100.F3000.S1000;
G01 · · ·

Incidental information
              (Identifier:INCIDENTAL)

tool-A.INCIDENTAL3
              tool-C.INCIDENTAL3
            work-type-B.INCIDENTAL4
```

NUMERICAL CONTROL APPARATUS, NUMERICAL CONTROL METHOD AND COMPUTER PROGRAM FOR CONTROLLING MACHINE TOOL

RELATED APPLICATIONS

The present application claims priority to Japanese Patent Application Number 2015-251175 filed Dec. 24, 2015, the disclosure of which is hereby incorporated by reference herein in its entirety.

BACKGROUND OF THE INVENTION

1. Field of the Invention

The invention relates to a numerical control apparatus, a numerical control method, and a computer program for controlling a machine tool.

2. Description of the Related Art

A numerical control apparatus is known that determines whether to operate a machine tool depending on a program name of a machining program, or a level of an operator (e.g., Japanese Unexamined Patent Publication (Kokai) No. 5-313720 and Japanese Unexamined Patent Publication (Kokai) No. 2000-86964).

What is desired is a technique of enabling efficient selection of a numerical control apparatus for a machine tool suitable for executing a particular machining program.

SUMMARY OF THE INVENTION

In an aspect of the invention, a numerical control apparatus, which is configured to control a machine tool, comprises a storage configured to store unique information unique to the machine tool, the numerical control apparatus, or an operator; and a receiving part configured to receive a machining program including incidental information. The incidental information includes information unique to the machine tool, the numerical control apparatus, or the operator capable of executing the machining program.

Further, the numerical control apparatus comprises a determination part configured to check the incidental information included in the machining program received by the receiving part against the unique information stored in the storage, and determines whether information matching the unique information is included in the incidental information; and a machine controller configured to execute the machining program received by the receiving part so as to control the machine tool, only when it is determined that the information matching the unique information is included in the incidental information.

The unique information may include a device-unique number uniquely assigned to the machine tool or the numerical control apparatus, an operator-unique number uniquely assigned to the operator, tool information indicative of information on a tool to be used in the machine tool; or workpiece information indicative of information on a workpiece to be machined by the machine tool.

The numerical control apparatus may further include an input part for the operator-unique number, and the storage may store the operator-unique number inputted to the input part.

The receiving part may receive the machining program transmitted from an external device via a network. The receiving part may receive the machining program stored in an external memory detachably attached to the numerical control apparatus. The numerical control apparatus may further comprise an alarm generation part configured to generate an alarm, when the determination part determines that the information matching the unique information is not included in the incidental information.

In another aspect of the invention, a method of controlling a machine tool by a numerical control apparatus, comprises receiving a machining program including incidental information, the incidental information including information unique to the machine tool, the numerical control apparatus, or the operator capable of executing the machining program.

Further, the method comprises checking the incidental information included in the received machining program against unique information which is stored in the numerical control apparatus and which is unique to the machine tool, the numerical control apparatus, or the operator, and determining whether information matching the unique information is included in the incidental information.

Further, the method comprises executing the received machining program so as to control the machine tool, only when it is determined that the information matching the unique information is included in the incidental information. In still another aspect of the invention, a computer program causes the numerical control apparatus to execute the above-described method.

BRIEF DESCRIPTION OF THE DRAWINGS

The above-described or other objects, features and advantages of the invention will be clarified by description of the following exemplary embodiments with reference to the accompanying drawings, in which:

FIG. 3 is a diagram showing a data structure of a machining program according to an embodiment;

FIG. 5 is a diagram showing a data structure of a machining program according to another embodiment;

DETAILED DESCRIPTION

Figure 1:
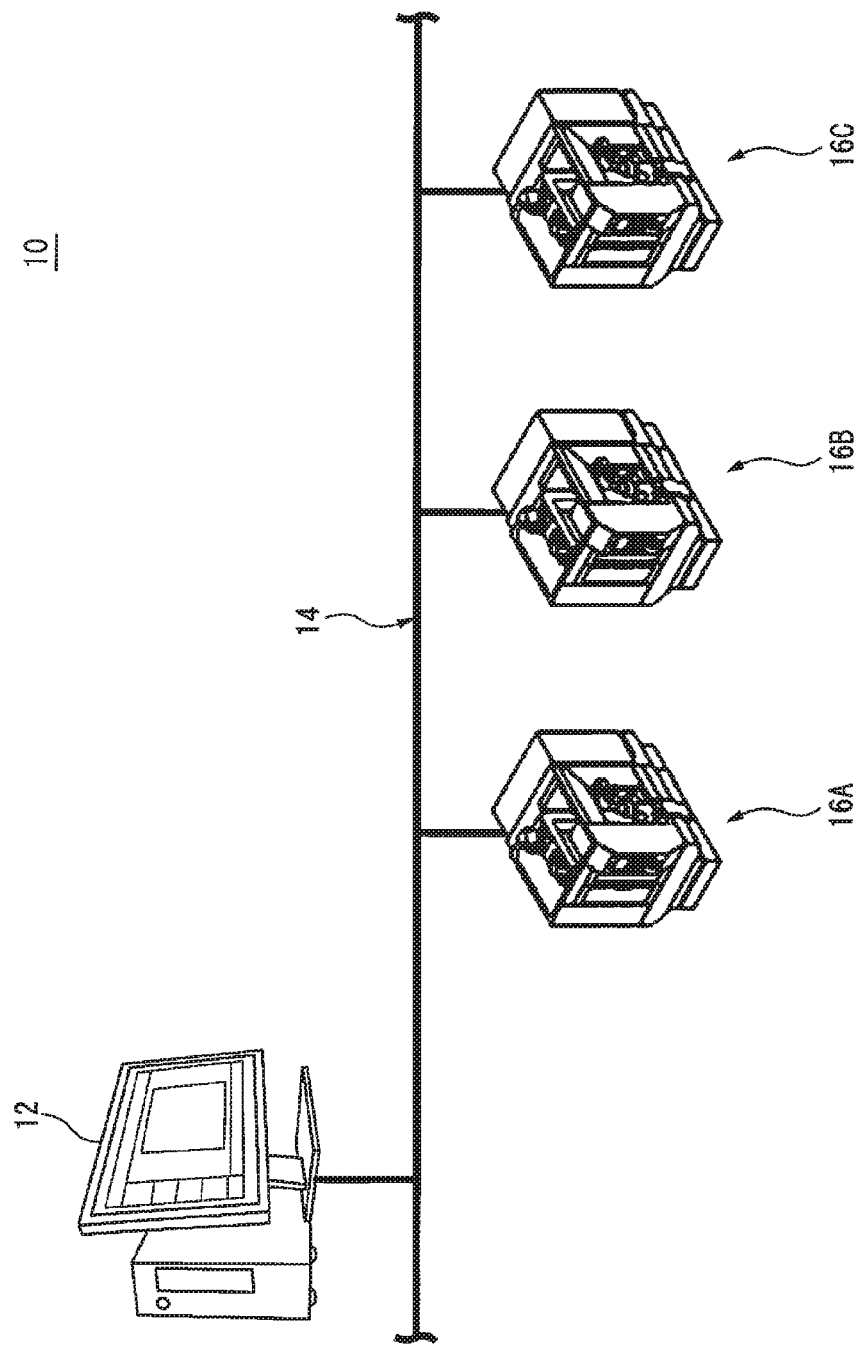
FIG. 1 is a diagram of a network system according to an embodiment of the invention.

Hereinafter, embodiments of the invention will be described in detail based on the drawings. First, a network system 10 according to an embodiment will be described with reference to FIG. 1. The network system 10 includes an external device 12, and a plurality of machine tool systems 16A, 16B, and 16C connected to the external device 12 via a network 14.

The external device 12 includes e.g. a personal computer (PC), and transmits a machining program to the machine tool systems 16A, 16B, and 16C via the network 14. The network 14 is a communication network such as an Internet or a LAN, and transfers information wiredly or wirelessly.

Figure 2:
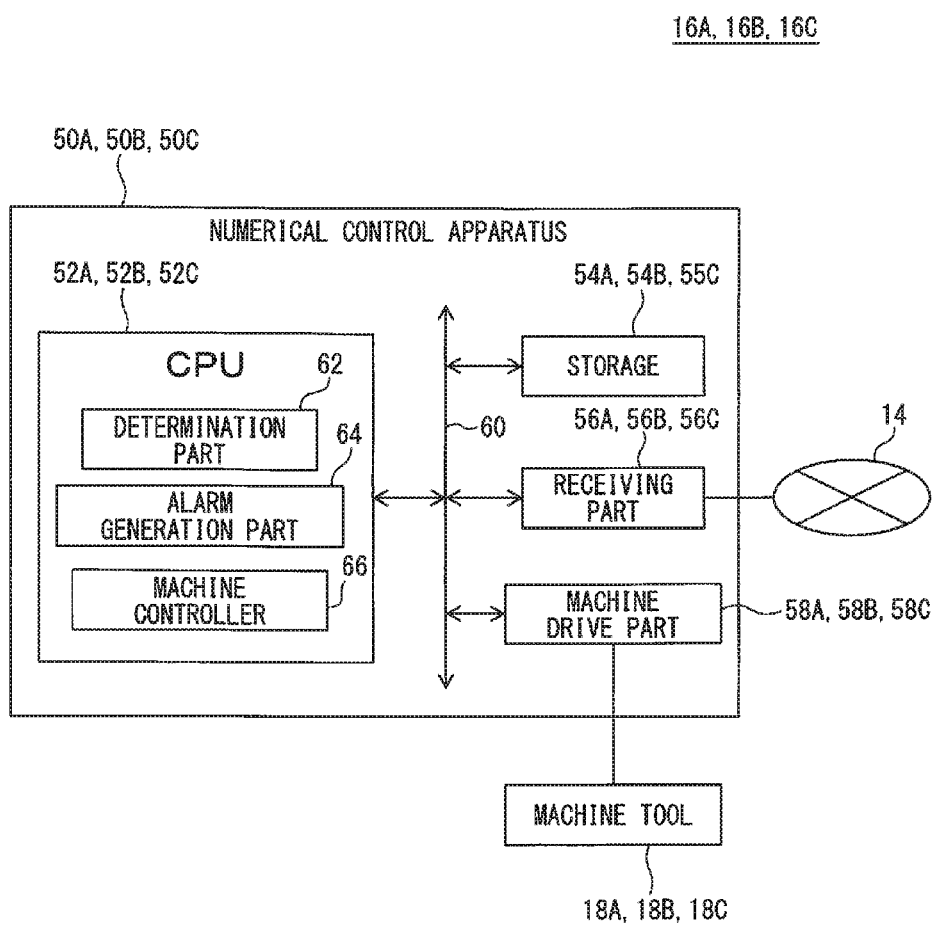
FIG. 2 is a block diagram of the machine tool system shown in FIG. 1.

Next, the machine tool systems 16A, 16B, and 16C are described with reference to FIG. 2. The machine tool system 16A includes a machine tool 18A, and a numerical control apparatus 50A configured to control the machine tool 18A.

The machine tool 18A includes a machining head (not shown) to which a tool is attached, and a work table (not shown) on which a workpiece is placed. Servomotors (not shown) are built in the machining head and the work table.

The numerical control apparatus 50A sends a command to the servomotor built in the work table so as to move the work table to position the workpiece with respect to the tool attached to the machining head. In addition, the numerical control apparatus 50A sends a command to the servomotor built in the machining head so as to drive the tool attached to the machining head to rotate. The workpiece placed on the work table is machined by the rotated tool.

The numerical control apparatus 50A includes a central processing unit (CPU) 52A, a storage 54A, a receiving part 56A, and a machine drive part 58A. The CPU 52A is communicably connected to the storage 54A, the receiving part 56A, and the machine drive part 58A via a bus 60. The CPU 52A executes various arithmetic processing, along with exchanging information with the storage 54A, the receiving part 56A, and the machine drive part 58A.

The storage 54A includes a system memory comprised of an electrically erasable/recordable non-volatile memory such as an EEPROM (registered trademark), and a work memory comprised of a fast readable/writable random access memory such as a DRAM and an SRAM. The storage 54A is capable of storing unique information and a machining program, which will be described later.

The receiving part 56A is connected to the external device 12 via the network 14, and receives information transmitted from the external device 12. The receiving part 56A sends the information received from the external device 12 to the CPU 52A.

The machine drive part 58A includes e.g. a servomotor control circuit and a servo amplifier, and drives each servomotor built in the machine tool 18A in accordance with a command from the CPU 52A.

The machine tool systems 16B and 16C respectively include machine tools 18B and 18C, and numerical control apparatuses 50B and 50C configured to control the machine tools 18B and 18C.

In this embodiment, the machine tools 18A, 18B, and 18C have configurations different from each other, and execute different kinds of machining. Specifically, different kinds of tools are attached to the machine tools 18A, 18B, and 18C respectively, so as to be able to machine different kinds of workpieces.

The numerical control apparatuses 50B and 50C have configurations similar as that of the numerical control apparatus 50A. Specifically, the numerical control apparatuses 50B and 50C respectively include CPUs 52B and 52C, storages 54B and 54C, receiving parts 56B and 56C, and machine drive parts 58B and 58C.

Next, an example of a function of the network system 10 will be described. The external device 12 transmits a machining program to the machine tool system 16A, 16B, and 16C via the network 14.

In general, there is a compatible or incompatible relationship between a machine tool and a machining program. If a machine tool is operated by a machining program which is incompatible with the machine tool, a desired result of machining may not be obtained, and moreover, interference may be generated among a member of the machine tool, a tool, and a workpiece.

As described above, the machine tools 18A, 18B, and 18C have configurations different from each other, and execute different kinds of machining. Therefore, in order to appropriately operate the machine tools 18A, 18B, and 18C, it is necessary for the numerical control apparatuses 50A, 50B, and 50C to execute machining programs compatible with the machine tools 18A, 18B, and 18C, respectively.

In view of the above, this embodiment checks unique information stored in each of the numerical control apparatuses 50A, 50B, and 50C against incidental information incidental to the machining program, and allows only the numerical control apparatus 50A, 50B, and/or 50C compatible with the machining program to execute the machining program.

The "unique information" refers to information unique to the machine tool 18A, the numerical control apparatus 50A, or an operator. In this example, a device-unique number is pre-stored as the unique information in the storage 54A of the numerical control apparatus 50A. The device-unique number includes a CNC-unique number and a machine-unique number.

The CNC-unique number refers to a character string number (so-called, a serial number) that a manufacturer of the numerical control apparatus 50A assigns uniquely to the numerical control apparatus 50A depending on e.g. a configuration or function thereof. The machine-unique number refers to a character string number that a user of the machine tool 18A assigns uniquely to the machine tool 18A depending on e.g. a configuration or function thereof. The machine-unique number is e.g. a program name of a PMC ladder program.

In this example, the storage 54A stores a CNC-unique number "CNC-1" and a machine-unique number "MTA-1", as the device-unique number.

In the storage 54B of the numerical control apparatus 50B, a device-unique number is also pre-stored. This device-unique number has a character string different from the device-unique number of the numerical control apparatus 50A and the machine tool 18A. In this example, the storage 54B stores a CNC-unique number "CNC-2" unique to the numerical control apparatus 50B and a machine-unique number "MTA-2" unique to the machine tool 18B, as the device-unique number.

In the storage 54C of the numerical control apparatus 50C, a device-unique number is also pre-stored. This device-unique numbers has a character string different from the device-unique numbers of the numerical control apparatus 50A and 50B and the machine tools 18A and 18B. In this example, the storage 54C stores a CNC-unique number "CNC-3" unique to the numerical control apparatus 50C and a machine-unique number "MTB-1" unique to the machine tool 18C, as the device-unique number.

On the other hand, the machining program transmitted by the external device 12 includes incidental information. The incidental information includes information unique to the particular machine tool 18A, 18B, 18C capable of executing the machining program, and information unique to the particular numerical control apparatus 50A, 50B and/or 50C capable of executing the machining program.

More specifically, the incidental information includes a number matching the CNC-unique number of the particular numerical control apparatus 50A, 50B and/or 50C capable of executing the machining program, and a number matching the machine-unique number of the particular machine tool 18A, 18B and/or 18C capable of executing the machining program.

FIG. 3 shows an example of a data structure of the machining program. The incidental information included in this machining program includes numbers respectively matching the CNC-unique number of the numerical control apparatus 50A and the machine-unique number of the machine tool 18A (i.e., "CNC-1", "MTA-1").

In addition, this incidental information includes numbers respectively matching the CNC-unique number of the numerical control apparatus 50B and the machine-unique number of the machine tool 18B (i.e., "CNC-2", "MTA-2").

The incidental information in the machining program shown in FIG. 3 is assigned with an identifier (".INCIDENTAL") for identification of the incidental information. More specifically, in the incidental information, an identifier (".INCIDENTAL1") for identification of CNC-unique number is assigned to posterior of the number corresponding to the CNC-unique number, while an identifier (".INCIDENTAL2") for identification of machine-unique number is assigned to posterior of the number corresponding to the machine-unique number.

Figure 4:
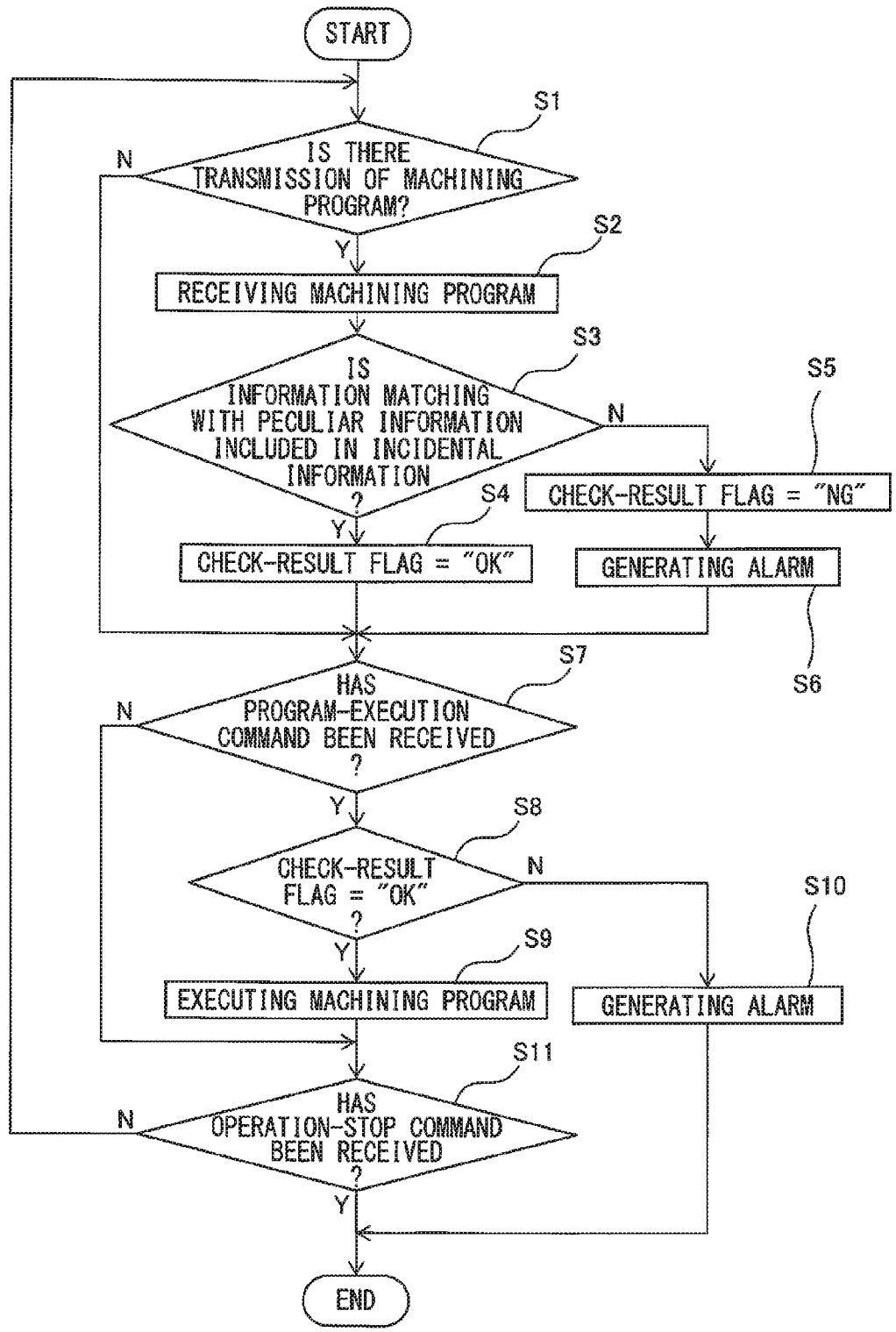
FIG. 4 is a flowchart showing an example of an operation flow of the numerical control apparatus shown in FIG. 2.

Next, with reference to FIG. 4, an example of an operation flow of the numerical control apparatus 50A when the machining program shown in FIG. 3 is transmitted from the external device 12 will be described. The flow shown in FIG. 4 is started when the numerical control apparatus 50A is started.

At step S1, the CPU 52A determines whether there is a transmission of the machining program from the external device 12. For example, the external device 12 sends a machining program reception request to the CPU 52A when transmitting the machining program.

When the CPU 52A receives the machining program reception request, the CPU 52A determines that there is a transmission of the machining program from the external device 12 (i.e., determines "YES"). Then, the CPU 52A sends a command to the receiving part 56A so as to send a machining program transmission request to the external device 12 from the receiving part 56A. Due to this, a communication between the external device 12 and the receiving part 56A is established. Then, the CPU 52A proceeds to step S2.

When the external device 12 receives the machining program transmission request, it transmits the machining program to the receiving part 56A via the network 14. On the other hand, when the CPU 52A does not receive the machining program reception request, the CPU 52A determines that there is no transmission of the machining program from the external device 12 (i.e., determines "NO"), and proceeds to step S7.

At step S2, the receiving part 56A receives the machining program transmitted from the external device 12 via the network 14, and sends it to the CPU 52A. The CPU 52A stores the machining program sent from the receiving part 56A in the storage 54A.

At Step S3, the CPU 52A checks the unique information pre-stored in the storage 54A against the incidental information included in the machining program received at Step S2, and determines whether information matching the unique information is included in the incidental information.

Specifically, the CPU 52A reads out from the storage 54A the device-unique number (i.e., a CNC-unique number: "CNC-1" and a machine-unique number: "MTA-1") as the unique information.

On the other hand, the CPU 52A refers to a row of an identifier: ".INCIDENTAL1" in the received machining program. Then, the CPU 52A determines whether a number matching the CNC-unique number of the numerical control apparatus 50A is included in the incidental information.

In addition, the CPU 52A refers to a row of an identifier: ".INCIDENTAL2" in the received machining program, and determines whether a number matching the machine-unique number of the machine tool 18A is included in the incidental information.

In the example shown in FIG. 3, a number matching the CNC-unique number of the numerical control apparatus 50A, i.e., "CNC-1", and a number matching the machine-unique number of the machine tool 18A, i.e., "MTA-1", are included in the rows of the identifiers: ".INCIDENTAL1" and ".INCIDENTAL2" in the incidental information.

In this case, the CPU 52A determines "YES" at this step S3, and proceeds to step S4. On the other hand, if a number matching the device-unique number of the numerical control apparatus 50A and the machine tool 18A is not included in the incidental information, the CPU 52A determines "NO" at this step S3, and proceeds to step S5.

Thus, in this embodiment, the CPU 52A functions as a determination part 62 (FIG. 2) configured to determine whether information matching the unique information is included in the incidental information.

At Step S4, the CPU 52A sets a check-result flag in the machining program received at step S2 to "OK".

On the other hand, when the CPU 52A determines "NO" at step S3, at step S5, the CPU 52A sets the check-result flag in the machining program received at step S2 to "NG".

At Step S6, the CPU 52A generates an alarm signal. For example, the CPU 52A generates an alarm signal in the form of image or sound indicating that "This device cannot execute the downloaded machining program". Then, the CPU 52A transmits the generated alarm signal to a display or a loudspeaker (both not shown), and outputs the alarm to an operator via the display or the loudspeaker.

At step S7, the CPU 52A determines whether it receives an execution command for a particular machining program from the operator. As an example, the operator uses an input device (not shown), such as a keyboard, provided at the numerical control apparatus 50A so as to select a desired one of a variety of machining programs stored in the storage 54A.

If the operator selects the machining program shown in FIG. 3, which has been received at step S2, the input device receives an input operation from the operator, and transmits an execution command for the machining program received at step S2 to the CPU 52A.

When the CPU 52A receives the execution command from the input part, the CPU 52A determines "YES", and proceeds to step S8. On the other hand, when the CPU 52A does not receive the execution command from the input part, the CPU 52A determines "NO", and proceeds to step S11.

At step S8, the CPU 52A refers to the check-result flag in the machining program for which the execution command has been received at step S7, and determines whether the check-result flag is set to "OK".

For example, if the execution command for the machining program shown in FIG. 3, which has been received at step S2, is received at step S7, the check-result flag in the machining program has been set to "OK" at step S4.

Accordingly, in this case, the CPU 52A determines "YES", and proceeds to step S9. On the other hand, if the check-result flag in the machining program for which the execution command has been received at step S7 is set to "NG", the CPU 52A determines "NO", and proceeds to step S10.

At Step S9, the CPU 52A executes the machining program for which the execution command has been received at step S7. Specifically, the CPU 52A sends a command to the machine drive part 58A in accordance with the machining program, so as to drive the servomotors built in the machining head and the work table (not shown). As a result, a workpiece is machined by the tool attached to the machining head in accordance with the machining program.

On the other hand, when it is determined "NO" at step S8, at step S10, the CPU 52A generates an alarm signal in the form of image or sound indicating that e.g. "This device cannot execute the designated machining program". Thus, in this embodiment, the CPU 52A functions as an alarm generation part 64 (FIG. 2) configured to generate an alarm.

The CPU 52A transmits the generated alarm signal to the display or the loudspeaker (not shown), and outputs the alarm to the operator by means of the display or the loudspeaker. After outputting the alarm, the CPU 52A stops the operation of the numerical control apparatus 50A, and ends the flow shown in FIG. 4.

As described above, in this embodiment, the CPU 52A executes the machining program so as to control the machine tool 18A, only when the CPU 52A determines that the information matching the unique information is included in the incidental information in the machining program and the CPU 52A sets the check-result flag in the machining program to "OK".

Thus, the CPU 52A functions as a machine controller 66 (FIG. 2) configured to execute the machining program so as to control the machine tool 18A.

At step S11, the CPU 52A determines whether it receives an operation-stop command from the operator or a host controller (e.g., the external device 12).

When the CPU 52A determines that it receives the operation stop command (i.e., determines "YES"), the CPU 52A stops the operation of the numerical control apparatus 50A, and ends the flow shown in FIG. 4. On the other hand, when the CPU 52A determines that it does not receive the operation stop command (i.e., determines "NO"), the CPU 52A returns to step S1.

Next, with reference to FIG. 4, an example of an operation flow of the numerical control apparatus 50B when the machining program shown in FIG. 3 is transmitted from the external device 12 will be described. Note that, detailed descriptions for processes similar as those in the above-mentioned numerical control apparatus 50A will be omitted.

After the flow in FIG. 4 is started, the CPU 52B executes the above-mentioned steps S1 and S2 in the same way as the numerical control apparatus 50A.

At Step S3, the CPU 52B functions as a determination part 62 (FIG. 2) so as to check unique information pre-stored in the storage 54B against incidental information included in the machining program received at step S2, and determine whether information matching the unique information is included in the incidental information.

Specifically, the CPU 52B reads out from the storage 54B the device-unique number (i.e., a CNC-unique number: "CNC-2" and a machine-unique number: "MTA-2") as the unique information.

On the other hand, the CPU 52B refers to a row of an identifier: ".INCIDENTAL1" in the machining program, and determines whether a number matching the CNC-unique number of the numerical control apparatus 50B is included in the incidental information.

In addition, the CPU 52B refers to a row of an identifier: ".INCIDENTAL2" in the machining program, and determines whether a number matching the machine-unique number of the machine tool 18B is included in the incidental information.

In the example shown in FIG. 3, a number matching the CNC-unique number of the numerical control apparatus 50B, i.e., "CNC-2", and a number matching the machine-unique number of the machine tool 18B, i.e., "MTA-2", are included in the incidental information.

In this case, the CPU 52B determines "YES", and proceeds to step S4. After step S3, the CPU 52B sequentially executes steps S4 to S11 in the same way as the numerical control apparatus 50A.

Next, with reference to FIG. 4, an example of an operation flow of the numerical control apparatus 50C when the machining program shown in FIG. 3 is transmitted from the external device 12 will be described. Note that, detailed descriptions for processes similar as those in the above-mentioned numerical control apparatus 50A will be omitted.

After the flow in FIG. 4 is started, the CPU 52C executes the above-mentioned steps S1 and S2 in the same way as the numerical control apparatus 50A.

At step S3, the CPU 52C functioning as a determination part 62 (FIG. 2) so as to check unique information pre-stored in the storage 54C against incidental information included in the machining program received at step S2, and determine whether information matching the device-unique number is included in the incidental information.

Specifically, the CPU 52C refers to a row of an identifier: ".INCIDENTAL1" in the machining program shown in FIG. 3, and determines whether a number matching the CNC-unique number of the numerical control apparatus 50C is included in the incidental information.

In addition, the CPU 52C refers to a row of an identifier: ".INCIDENTAL2" in the machining program, and determines whether a number matching the machine-unique number of the machine tool 18C is included in the incidental information.

In the example shown in FIG. 3, a number matching the CNC-unique number of the numerical control apparatus 50C, i.e., "CNC-3", is not included in the row of the identifier: ".INCIDENTAL1" in the incidental information.

Further, a number matching the machine-unique number of the machine tool 18C, i.e., "MTB-1", is not included in the row of the identifier: ".INCIDENTAL2" in the incidental information. In this case, the CPU 52C determines "NO", and proceeds to step S5.

Then, at step S5, the CPU 52C sets the check-result flag in the machining program received at step S2 to "NG". Then, at step S6, the CPU 52C functioning as an alarm generation part 64 (FIG. 2) so as to generate an alarm signal in the form of image or sound indicating that "This device cannot execute the machining program", and outputs the alarm signal to the operator.

If, at step S7, the CPU 52C receives the execution command for the machining program received at step S2, the check-result flag in the machining program has been set to "NG" at step S5.

Accordingly, at step S8, the CPU 52C determines "NO", and proceeds to step S10. Then, the CPU 52C generates an alarm signal and outputs the alarm to the operator. The, the CPU 52C ends the flow shown in FIG. 4.

As described above, according to the operation flow of this example, the unique information stored in the numerical control apparatuses 50A, 50B, and 50C are respectively checked against the incidental information incidental to the machining program (step S3), and an alarm is output to the operator when the both do not match with each other.

According to this configuration, the operator can automatically and intuitively recognize whether or not the machining program downloaded on the respective numerical control apparatus 50A, 50B, 50C from the external device 12 via the network 14 is executable by the numerical control apparatus 50A, 50B, 50C.

Consequently, it is possible to prevent the numerical control apparatus 50A, 50B, 50C from executing a machining program incompatible with the machine tool 18A, 18B, 18C so as to operate the machine tool 18A, 18B, 18C. Due to this, deterioration of machining accuracy and interference among a member, a tool and a workpiece of the machine tool can be reliably prevented.

Further, in the operation flow of this example, the CPU 52A, 52B, 52C executes only a machining program for which the check-result flag is set to "OK" at step S4, whereas the CPU 52A, 52B, 52C does not execute a machining program for which the check-result flag is set to "NG".

According to this configuration, it is more reliably prevent deterioration of machining accuracy and interference among a member, a tool and a workpiece of the machine tool, caused by operating the machine tool 18A, 18B, 18C with an incompatible machining program.

Further, in the operation flow of this example, the CPU 52A, 52B, 52C outputs an alarm to the operator not only at step S6 but also at step S10. According to this configuration, it is possible to alarm the operator against executing an incompatible machining program by the numerical control apparatus 50A, 50B, 50C in two steps.

Further, according to the operation flow of this example, the numerical control apparatus 50A, 50B, 50C can download a machining program from the external device 12 via the network 14 and execute it, as needed.

Due to this, there is no need for constantly storing various machining programs in the storage 54A, 54B, 54C. Accordingly, since the capacity or the number of the storage 54A, 54B, 54C can be reduced, it is possible to reduce the cost.

Further, in the operation flow of this example, the information, which is necessary for the numerical control apparatus 50A, 50B, 50C to determine whether or not the machining program is adequate, is incidental to the machining program as the incidental information. According to this configuration, since there is no need for storing such information in the storage 54A, 54B, 54C, the capacity or the number of the storage 54A, 54B, 54C can be reduced.

Further, in the operation flow of this example, two kinds of numbers, i.e., a CNC-unique number and a machine-unique number, are assigned to incidental information in the machining program. According to this configuration, it is possible to set a plurality of conditions for selecting the numerical control apparatus 50A, 50B, 50C to execute the machining program, and therefore it is possible to select the numerical control apparatus in accordance with the more detailed conditions.

Next, another example of a function of the network system 10 will be described. In this example, the storage 54A of the numerical control apparatus 50A pre-stores tool information and workpiece information as the unique information unique to the machine tool 18A.

The tool information indicates information on a tool to be used in the machine tool 18A, and is predetermined by an operator. As an example, if two kinds of tools A and B are available in the machine tool 18A, the storage 54A stores tool information of character string: "tool-A" and "tool-B", as the unique information.

The workpiece information indicates information on a workpiece to be machined by the machine tool 18A, and is predetermined by an operator. As an example, if a workpiece of type A can be machined by the machine tool 18A, the storage 54A stores the workpiece information of character string: "work-type-A", as the unique information.

The storage 54B of the numerical control apparatus 50B pre-stores tool information and workpiece information as the unique information unique to the machine tool 18B. As an example, if two kinds of tools A and C are available in the machine tool 18B, the storage 54B stores the tool information of character string: "tool-A" and "tool-C", as the unique information.

Further, if a workpiece of type B can be machined by the machine tool 18B, the storage 54B stores the workpiece information of character string: "work-type-B", as the unique information.

The storage 54C of the numerical control apparatus 50C pre-stores tool information and workpiece information as the unique information unique to the machine tool 18C. As an example, if one kind of tool D is available in the machine tool 18C, the storage 54C stores the tool information of character string: "tool-D", as the unique information.

Further, if a workpiece of type C can be machined by the machine tool 18C, the storage 54C stores the workpiece information of character string: "work-type-C", as the unique information.

On the other hand, a machining program transmitted by the external device 12 includes incidental information. This incidental information includes information unique to the particular machine tool 18A, 18B, and/or 18C capable of executing the machining program. In this example, the incidental information includes information respectively matching the tool information and the workpiece information of the particular machine tool 18A, 18B and/or 18C capable of executing the machining program.

Assuming that, the machining program transmitted by the external device 12 is suitable for machining a workpiece of type B with use of the tools A and C. FIG. 5 shows an example of a data structure of a machining program in this case.

The incidental information included in the machining program includes numbers matching the tool information of the tools A and C (i.e., "tool-A", "tool-C"). In addition, the incidental information includes a number matching the workpiece information of type B (i.e., "work-type-B").

In the incidental information of the machining program shown in FIG. 5, an identifier for identification of the incidental information (".INCIDENTAL") is assigned. More specifically, in the incidental information, an identifier for identification of the tool information (".INCIDENTAL3") is assigned posterior to the number corresponding to the tool information. Further, an identifier for identification of the workpiece information (".INCIDENTAL4") is assigned posterior to the number corresponding to the workpiece information.

Next, with reference to FIG. 4, an example of an operation flow of the numerical control apparatus 50A when the machining program shown in FIG. 5 is transmitted from the external device 12 will be described. Note that, detailed descriptions for processes similar as those in the above-mentioned example will be omitted.

The flow shown in FIG. 4 is started when the numerical control apparatus 50A is started. After the start of the flow in FIG. 4, the CPU 52A executes steps S1 and S2 in the same way as the above-described example.

At step S3, the CPU 52A checks the unique information pre-stored in the storage 54A against the incidental information included in the machining program received at step S2, and determines whether information matching the unique information is included in the incidental information.

Specifically, the CPU 52A reads out from the storage 54A the tool information (i.e., "tool-A" and "tool-B") and the workpiece information (i.e., "work-type-A"), as the unique information.

On the other hand, the CPU 52A refers to a row of the identifier: ".INCIDENTAL3" in the machining program shown in FIG. 5. Then, the CPU 52A determines whether a number matching the tool information read out from the storage 54A (i.e., "tool-A" and "tool-B") is included in the incidental information.

In the example shown in FIG. 5, "tool-B" is not included in the row of the identifier: ".INCIDENTAL3" in the incidental information. In this case, the CPU 52A determines that information matching the tool information is not included in the incidental information.

Thus, in this example, if at least one of a plurality of pieces of the tool information ("tool-A" and "tool-B") read out from the storage 54A is not included in the incidental information, the CPU 52A determines that information matching the tool information is not included in the incidental information.

The CPU 52A also refers to a row of the identifier (".INCIDENTAL4") in the machining program shown in FIG. 5, and determines whether a number matching the workpiece information read out from the storage 54A (i.e., "work-type-A") is included in the incidental information.

In the example shown in FIG. 5, "work-type-A" is not included in the incidental information. In this case, the CPU 52A determines that information matching the workpiece information is not included in the incidental information.

In this way, if information matching at least one of the tool information and the workpiece information read from the storage 54A is not included in the incidental information, the CPU 52A determines "NO", and proceeds to step S5.

On the other hand, if information respectively matching the tool information and the workpiece information read out from the storage 54A are included in the incidental information, the CPU 52A determines "YES", and proceeds to step S4. After step S3, the CPU 52A executes steps S4 to S11 in the same way as the above-described example.

For example, when the operator gives a command for executing the machining program shown in FIG. 5 at step S7, the CPU 52A determines "NO" at step S8, and generates an alarm at Step S10.

Next, with reference to FIG. 4, an example of an operation flow of the numerical control apparatus 50B when the machining program shown in FIG. 5 is transmitted from the external device 12 will be described. Note that, detailed description for processes similar as those in the above-described examples will be omitted.

After the flow in FIG. 4 is started, the CPU 52B executes steps S1 and S2 in the same way as the above-described example.

At step S3, the CPU 52B checks the unique information pre-stored in the storage 54B against the incidental information included in the machining program received at step S2, and determines whether information matching the unique information is included in the incidental information.

Specifically, the CPU 52B reads out from the storage 54B the tool information (i.e., "tool-A" and "tool-C") and workpiece information (i.e., "work-type-B"), as the unique information.

On the other hand, the CPU 52B refers to a row of the identifier: ".INCIDENTAL3" in the machining program shown in FIG. 5. Then, the CPU 52B determines whether a number matching the tool information read out from the storage 54B (i.e., "tool-A" and "tool-C") is included in the incidental information. In the example shown in FIG. 5, "tool-A" and "tool-C" are included in the incidental information.

The CPU 52B also refers to a row of the identifier: ".INCIDENTAL4" in the machining program shown in FIG. 5, and determines whether a number matching the workpiece information read out from the storage 54B (i.e., "work-type-B") is included in the incidental information.

In the example shown in FIG. 5, "work-type-B" is included in the incidental information. Therefore, the CPU 52B determines "YES", and proceeds to step S4. After step S3, the CPU 52B executes steps S4 to S11 in the same way as the above-described example.

For example, when the operator gives a command for executing the machining program shown in FIG. 5 at step S7, the CPU 52B determines "YES" at step S8, and executes the machining program at step S9.

Next, with reference to FIG. 4, an example of an operation flow of the numerical control apparatus 50C when the machining program shown in FIG. 5 is transmitted from the external device 12 will be described. Note that, detailed descriptions for processes similar as those in the above-mentioned example will be omitted.

After the flow in FIG. 4 is started, the CPU 52C executes steps S1 and S2 in the same way as the above-described example.

At step S3, the CPU 52C checks the unique information pre-stored in the storage 54C against the incidental information included in the machining program received at step S2, and determines whether information matching the unique information is included in the incidental information.

Specifically, the CPU 52C reads out from the storage 54C the tool information (i.e., "tool-D") and the workpiece information (i.e., "work-type-C"), as the unique information.

On the other hand, the CPU 52C refers to a row of the identifier: ".INCIDENTAL3" in the machining program shown in FIG. 5. Then, the CPU 52C determines whether a number matching the tool information read out from the storage 54C (i.e., "tool-D") is included in the incidental information. In the example shown in FIG. 5, "tool-D" is not included in the incidental information.

The CPU 52C also refers to a row of the identifier: ".INCIDENTAL4" in the machining program shown in FIG. 5, and determines whether a number matching the workpiece information read out from the storage 54C (i.e., "work-type-C") is included in the incidental information. In the example shown in FIG. 5, "work-type-C" is not included in the incidental information.

Therefore, in this case, the CPU 52C determines "NO", and proceeds to step S5. After step S3, the CPU 52C executes steps S4 to S11 in the same way as the above-described example.

For example, when the operator gives a command for executing the machining program shown in FIG. 5 at step S7, the CPU 52C determines "NO" at step S8, and generates an alarm at step S10.

According to the operation flow of this example, the tool information and workpiece information are used to determine whether a machining program downloaded on each of the numerical control apparatus 50A, 50B, 50C is suitable for being executed by the numerical control apparatus 50A, 50B, 50C.

According to this configuration, an operator can automatically and intuitively recognize whether or not the downloaded machining program is suitable for being executed by the individual numerical control apparatus 50A, 50B, 50C, similarly as the above-described example.

Further, in this example, the incidental information in the machining program is assigned with the tool information and the workpiece information necessary for machining by the machine tool 18A, 18B, 18C. According to this configuration, it possible to select the numerical control apparatus 50A, 50B, 50C to execute the machining program by conditions in accordance with actual machining on a workpiece.

Figure 6:
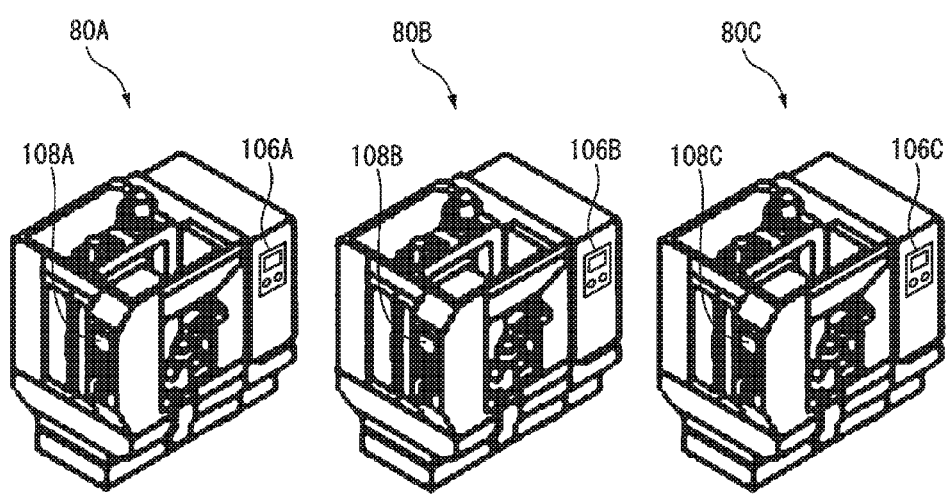
FIG. 6 is a diagram of machine tool systems according to another embodiment.
Figure 6:
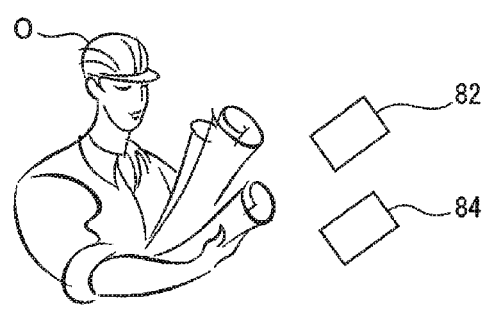

Next, with reference to FIGS. 6 and 7, machine tool systems 80A, 80B, and 80C according to another embodiment will be described. Note that, in this embodiment, elements similar to those in the above-described embodiment are assigned the same reference numerals, and detailed descriptions thereof will be omitted.

The machine tool system 80A includes a machine tool 18A, and a numerical control apparatus 100A configured to control the machine tool 18A. The numerical control apparatus 100A includes a storage 54A, a machine drive part 58A, a CPU 102A, a receiving part 104A, and an ID reader 106A.

The CPU 102A is communicably connected to the storage 54A, the machine drive part 58A, the receiving part 104A, and the ID reader 106A via the bus 60. The CPU 102A executes various arithmetic processing, along with exchanging information with these components.

The receiving part 104A receives data stored in an external memory 82 (FIG. 1) from the external memory 82.

Specifically, the external memory 82 is detachably inserted by an operator O into a memory-insertion port 108A (e.g., Ethernet port (registered trademark)) provided at the numerical control apparatus 100A.

If the external memory 82 is inserted into the memory insertion port 108A, the receiving part 104A is communicably connected to the external memory 82 so as to be able to receive data stored in the external memory 82 in accordance with a command from the CPU 102A.

The ID reader 106A receives from an ID card 84 held by the operator O an input of an operator-unique number of the operator O as unique information unique to the operator O, by using so-called an RFID technology.

More specifically, when the operator O arranges the ID card 84 to be close to the ID reader 106A, the ID reader 106A wirelessly communicates with an IC tag built in the ID card 84 so as to acquire the operator-unique number stored in the IC tag.

The operator-unique number is a number uniquely assigned to the operator O, and is e.g. an ID number or an employee number of the operator. In this embodiment, the operator O is assigned with an operator-unique number: "OPR-1".

The ID reader 106A sends the operator-unique number acquired from the ID card 84 to the CPU 102A. The CPU 102A stores the operator-unique number acquired by the ID reader 106A in the storage 54A.

Thus, in this embodiment, the ID reader 106A functions as an input part 110 (FIG. 7) for inputting the operator-unique number. In addition, the storage 54A pre-stores the above-mentioned machine-unique number: "MTA-1" as the unique information unique to the machine tool 18A.

The machine tool systems 80B and 80C respectively include machine tools 18B and 18C, and numerical control apparatuses 100B and 100C configured to control the machine tools 18B and 18C.

The numerical control apparatuses 100B and 100C have configurations the same as those of the numerical control apparatus 100A. Specifically, the numerical control apparatuses 100B and 100C respectively include storages 54B and 54C, machine drive parts 58B and 58C, CPUs 102B and 102C, receiving parts 104B and 104C, and ID readers 106B and 106C.

The external memory 82 is inserted into memory-insertion ports 108B and 108C respectively provided at the numerical control apparatuses 100B and 100C. Thus, the receiving parts 104B and 104C can receive data from the external memory 82.

In addition, each of the ID readers 106B and 106C can receive from the ID card 84 an input of the operator-unique number as the unique information unique to the operator O.

The storage 54B of the numerical control apparatus 100B pre-stores the above-mentioned machine-unique number: "MTA-2", as the unique information unique to the machine tool 18B. On the other hand, the storage 54C of the numerical control apparatus 100C pre-stores the above-mentioned machine-unique number: "MTB-1", as the unique information unique to the machine tool 18C.

Figure 8:
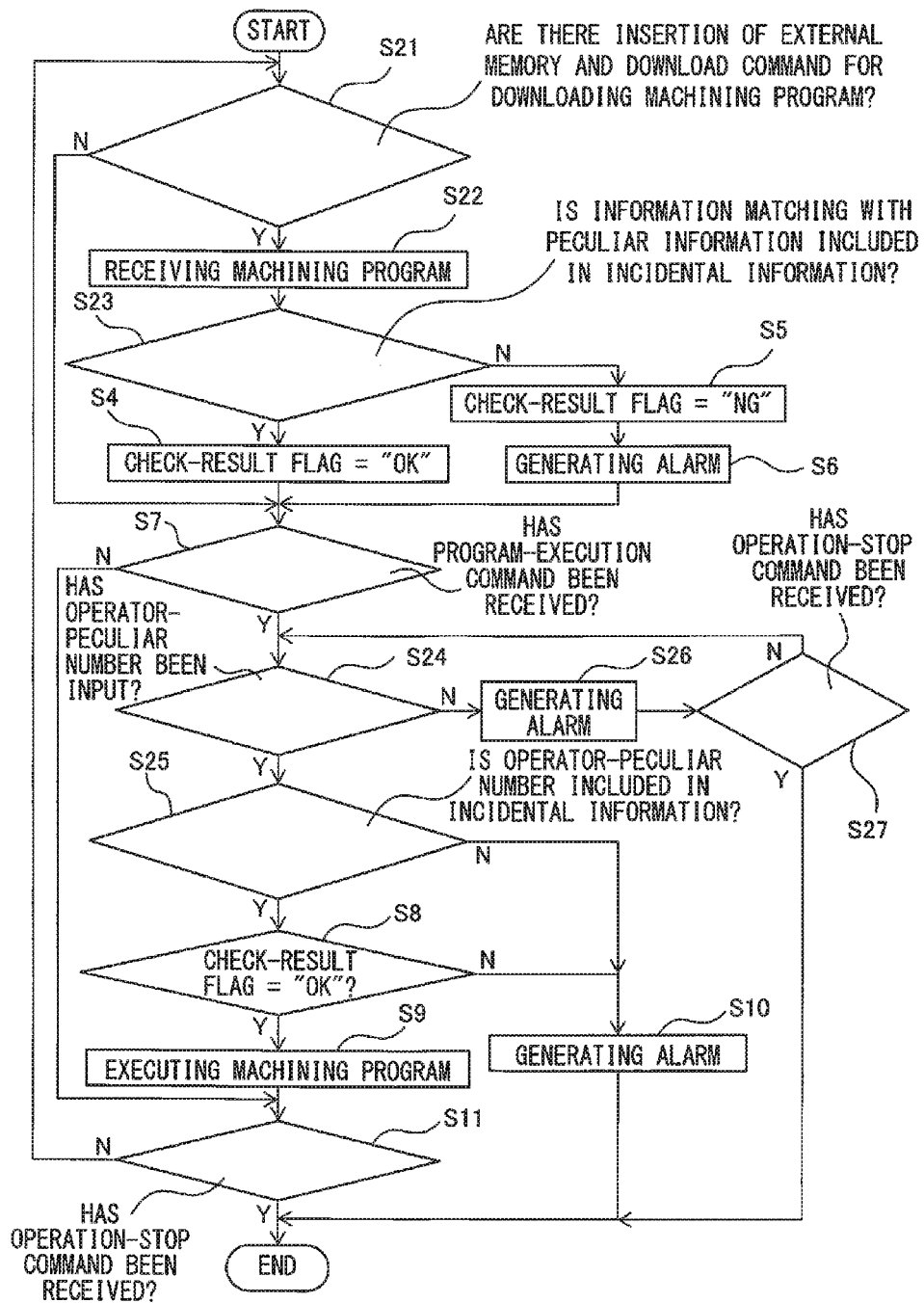
FIG. 8 is a flowchart showing an example of an operation flow of the numerical control apparatus shown in FIG. 7.

Next, with reference to FIG. 8, an example of a function of the machine tool system 80A will be described. Note that, in the flow shown in FIG. 8, processes similar to those in the flow shown in FIG. 4 are assigned the same reference numerals, and detailed descriptions thereof will be omitted. The flow shown in FIG. 8 is started when the numerical control apparatus 100A is started.

At step S21, the CPU 102A determines whether the external memory 82 is inserted into the memory-insertion port 108A and the CPU 102A receives a download command for downloading a machining program stored in the external memory 82 on the numerical control apparatus 100A.

Figure 9:
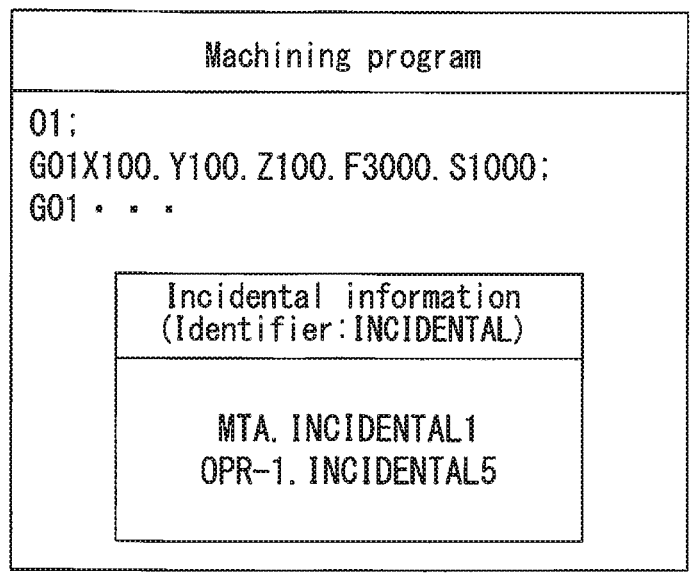
FIG. 9 is a diagram showing a data structure of a machining program according to still another embodiment.

As an example, a machining program shown in FIG. 9 is stored in the external memory 82. The incidental information included in this machining program includes incidental information: "MTA" identified by the identifier: ".INCIDENTAL1", and incidental information: "OPR-1" identified by an identifier: ".INCIDENTAL5".

The incidental information "MTA" corresponds to the machine-unique number, while the incidental information "OPR-1" corresponds to the operator-unique number.

In order to execute the machining program stored in the external memory 82 in the machine tool system 80A, the operator O inserts the external memory 82 into the memory-insertion port 108A of the numerical control apparatus 100A.

As a result, the receiving part 104A of the numerical control apparatus 100A and the external memory 82 are communicably connected to each other. When the external memory 82 is inserted into the memory-insertion port 108A, the receiving part 104A sends a memory-insertion signal to the CPU 102A.

After inserting the external memory 82 into the memory-insertion port 108A, the operator O manipulates an input device (e.g., a keyboard) provided at the numerical control apparatus 100A, and inputs a download command for downloading the machining program stored in the external memory 82 on the numerical control apparatus 100A.

At this step S21, when the CPU 102A receives the memory-insertion signal from the receiving part 104A and the download command from the operator O, the CPU 102A determines "YES", and proceeds to step S22. On the other hand, when the CPU 102A does not receives the memory insertion signal or the download command, the CPU 102A determines "NO", and proceeds to step S7.

At step S22, the receiving part 104A communicates with the external memory 82 so as to receive the machining program from the external memory 82, and sends the machining program to the CPU 102A. The CPU 102A stores the machining program sent from the receiving part 104A in the storage 54A.

At step S23, the CPU 102A checks the unique information pre-stored in the storage 54A against the incidental information included in the machining program received at step S22, and determines whether information matching the unique information is included in the incidental information.

Specifically, the CPU 102A reads out from the storage 54A the machine-unique number "MTA-1" as the unique information. On the other hand, the CPU 102A refers to a row of the identifier ".INCIDENTAL1" in the machining program shown in FIG. 9.

In this example, the CPU 102A determines whether numbers matching the first three digits of the machine-unique number read out from the storage 54A is included in the incidental information (i.e., "MTA") identified by the identifier ".INCIDENTAL1".

In this example, since the numbers "MTA" matching the first three digits "MTA" of the machine-unique number is included in the incidental information, the CPU 102A determines "YES" at this step S23, and proceeds to step S4. On the other hand, when the numbers matching the first three digits of the machine-unique number is not included in the incidental information, the CPU 102A determines "NO" at this step S23, and proceeds to step S5.

After determining "YES" at step S7, at step S24, the CPU 102A determines whether an operator number is input to the ID reader 106A. Specifically, when the operator O arranges the ID card 84 to be close to the ID reader 106A, the ID reader 106A acquires the operator-unique number (i.e., "OPR-1") from the ID card 84.

The ID reader 106A sends the acquired operator-unique number to the CPU 102A. The CPU 102A stores the operator-unique number received from the ID reader 106A in the storage 54A.

At this time, the CPU 102A determines that an operator number is input (i.e., determines "YES"), and proceeds to step S25. On the other hand, when an operator number is not sent from the ID reader 106A, the CPU 102A determines "NO", and proceeds to step S26.

At step S25, the CPU 102A checks the operator-unique number stored in the storage 54A at step S24 against the incidental information included in the machining program received at step S22, and determines whether a number matching the operator-unique number is included in the incidental information.

Specifically, the CPU 102A reads out from the storage 54A the operator-unique number "OPR-1". On the other hand, the CPU 102A refers to a row of the identifier ".INCIDENTAL5" in the machining program shown in FIG. 9.

In this example, since the number matching the operator-unique number "OPR-1" read out from the storage 54A is included in the incidental information identified by the identifier ".INCIDENTAL5", the CPU 102A determines "YES" at this step S25, and proceeds to step S8.

On the other hand, when the number matching the operator-unique number is not included in the incidental information identified by the identifier ".INCIDENTAL5", the CPU 102A determines "NO" at this step S25, and proceeds to step S10.

Thus, in this example, the CPU 102A functions as a determination part 112 (FIG. 7) configured to determine whether information matching the unique information (the operator-unique number) is included in the incidental information.

Subsequently, the CPU 102A executes the above-mentioned step S8, and if the CPU 102A determines "YES" at step S8, the CPU 102 functions as a machine controller 114 (FIG. 7) so as to execute the above-mentioned step. On the other hand, when the CPU 102A determines "NO" at step S8, the CPU 102A functions as an alarm generation part 116 so as to execute the above-mentioned step S10. On the other hand, when the CPU 102A determines "NO" at step S24, at step S26, the CPU 102A generates an alarm signal in the form of image or sound indicating e.g. "Please check operator-unique number".

Then, at step S27, the CPU 102A determines whether the operation stop command is received from the operator or host controller (e.g., the external device 12), in the same way as the above-mentioned step S11.

When the CPU 102A determines that the operation stop command is received (i.e., determines "YES"), the CPU 102A stops the operation of the numerical control apparatus 100A, and ends the flow shown in FIG. 8. On the other hand, when the CPU 102A determines that the operation stop command is not received (i.e., determines "NO"), the CPU 102A returns to step S24.

Next, with reference to FIG. 8, an example of a function of the machine tool system 80B will be described. Note that, detailed descriptions of processes the same as those of the machine tool system 80A will be omitted. After the flow in FIG. 8 is started, the CPU 102B executes the above-mentioned steps S21 and S22, in the same way as the numerical control apparatus 100A.

At step S23, the CPU 102B functions as the determination part 112 (FIG. 7) so as to check the unique information pre-stored in the storage 54B against the incidental information included in the machining program received at step S22, and determine whether information matching the unique information is included in the incidental information.

Specifically, the CPU 102B reads out from the storage 54B the machine-unique number "MTA-2" as the unique information. On the other hand, the CPU 102B refers to a row of the identifier ".INCIDENTAL1" in the machining program shown in FIG. 9.

In this example, the CPU 102B determines whether the number matching the first three digits of the machine-unique number (i.e., "MTA") is included in the incidental information identified by the identifier ".INCIDENTAL1".

In this example, the number matching the first three digits "MTA" of the machine-unique number is included in the row of the identifier ".INCIDENTAL1" in the incidental information. Accordingly, the CPU 102B determines "YES" at this step S23, and proceeds to step S4. After step S23, the CPU 102B sequentially executes steps S4 to S7, S24 to S27, and S8 to S11, in the same way as the numerical control apparatus 100A.

Next, with reference to FIG. 8, an example of a function of the machine tool system 80C will be described. Note that, detailed description of processes the same as those of the machine tool system 80A will be omitted. After the flow in FIG. 8 is started, the CPU 102C executes the above-mentioned steps S21 and S22, in the same way as the numerical control apparatus 100A.

At step S23, the CPU 102C functions as the determination part 112 (FIG. 7) so as to check the unique information pre-stored in the storage 54C against the incidental information included in the machining program received at step S22, and determine whether information matching the unique information is included in the incidental information.

Specifically, the CPU 102C reads out from the storage 54C the machine-unique number: "MTB-1" as the unique information. On the other hand, the CPU 102C refers to a row of the identifier ".INCIDENTAL1" in the machining program shown in FIG. 9. The CPU 102C determines whether a number matching the first three digits of the machine-unique number is included in the row of the identifier ".INCIDENTAL1".

In this example, the number matching the first three digits of the machine-unique number, i.e., "MTB", is not included in the row of the identifier ".INCIDENTAL1". Accordingly, the CPU 102C determines "NO" at this step S23, and proceeds to step S5. After step S23, the CPU 102C sequentially executes steps S4 to S7, S24 to S27, and S8 to S11, in the same way as the numerical control apparatus 100A.

As stated above, in this example, it is determined whether the machining program downloaded on each of the numerical control apparatus 100A, 100B and 100C is suitable for being executed by the individual numerical control apparatuses 100A, 100B and 100C (step S23), with using the machine-unique number.

According to this configuration, the operator can automatically and intuitively recognize whether or not the downloaded machining program is suitable for being executed by the individual numerical control apparatuses 100A, 100B and 100C, similarly to the above-described example.

Further, in this example, it is determined whether the operator O is eligible for executing the machining program by the individual numerical control apparatuses 100A, 100B and 100C (step S25), with using the operator-unique number. According to this configuration, it is possible to limit the operator for manipulating the numerical control apparatus so as to execute the machining program, depending on e.g. the skill of the operator.

Note that, it is possible to construct a computer program which causes a computer to automatically execute the flow shown in FIG. 4 or 8. In this case, the storage 54A, 54B or 54C may pre-store the computer program, and the CPU 52A, 52B, 52C, 102A, 102B or 102C may execute the computer program.

Further, in the above-described embodiments, the identifier for identifying the incidental information is assigned posterior to a number corresponding to the unique information. However, the identifier for identifying the incidental information may be assigned prior to a number corresponding to the unique information. Alternatively, the identifier may be assigned prior and posterior to a number corresponding to the unique information, and a block between the prior and posterior identifiers may be recognized as the incidental information.

Further, in the flow shown in FIG. 8, the CPU 102A, 102B, 102C determines whether the first three digits of the machine-unique number match with the incidental information, at step S23 as stated above.

However, the CPU 102A, 102B, 102C may determine whether the first "n" digits ("n" is an integer of 2 or greater) of the machine-unique number match with the incidental information, at step S23.

Alternatively, the CPU 102A, 102B, 102C may determine whether "n" digits between the first character and the last character of the machine-unique number match with the incidental information.

Further, at step S3 of the flow shown in FIG. 4, the CPU 52A, 52B, 52C may determine whether the first "n" digits ("n" is an integer of 2 or greater) of the device-unique number (i.e., CNC-unique number, machine-unique number) match with the incidental information.

Further, at step S3 in FIG. 4, the CPU 52A, 52B, 52C may check the operator-unique number, instead of the device-unique number, against the incidental information, and determine whether a number matching the operator-unique number is included in the incidental information.

In this case, the storage 54A may store an operator-unique number uniquely assigned to a first operator $O_1$, the storage 54B may store an operator-unique number uniquely assigned to a second operator $O_2$, and the storage 54C may store an operator-unique number uniquely assigned to a third operator $O_3$.

Figure 7:
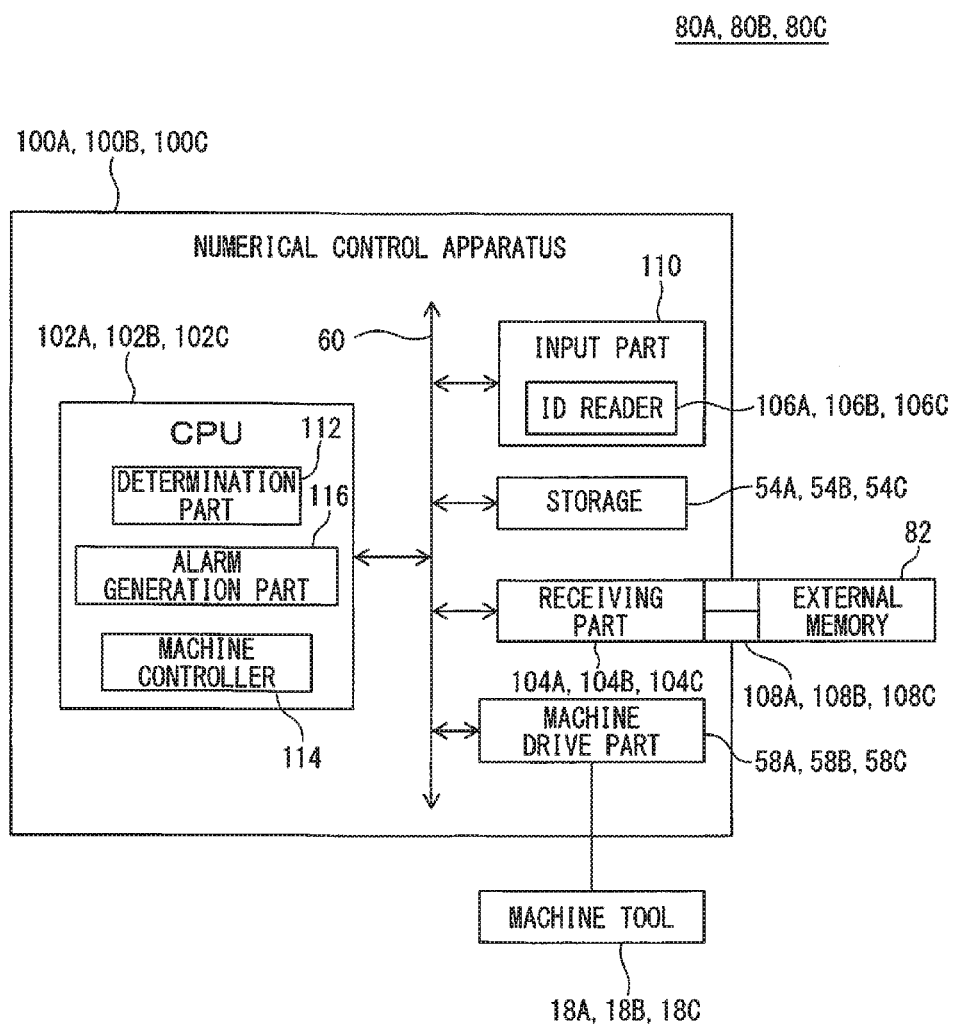
FIG. 7 is a block diagram of the machine tool systems shown in FIG. 6.

Further, in the embodiment shown in FIG. 7, the input part 110 may be constituted by a keyboard or the like, in place of the ID reader 106A, 106B, 106C, and the operator O may manipulate the keyboard to input an operator-unique number to the numerical control apparatus 100A, 100B, 100C.

In this case, the CPU 102A, 102B, 102C receives from the input part 110 the operator-unique number input by manipulating the keyboard, and stores it in the storage 54. Then, at step S24 in FIG. 8, the CPU 102A, 102B, 102C determines whether an operator-unique number is input by manipulating the keyboard.

Further, an arbitrary character string such as a password, or data (or a data file) such as an image or a sound is also applicable to the unique information and the incidental information.

As stated above, the invention has been described through the exemplary embodiments of the invention. However, the above-described exemplary embodiments do not limit the invention in the scope of the claims. In addition, forms of combinations of the features described in the exemplary embodiments of the invention may be also included in the technical scope of the invention. However, not all of the combinations of the features are preferable to a solution for the invention. Further, it is apparent to a person skilled in the art that various modifications or improvements are applicable to the above-described exemplary embodiments.

In addition, it is to be noted that an execution order of processing for an operation, a procedure, a step, a process, a stage, and the like in the device, the system, the program, and the method shown in the claims, the specification, and the drawings may be implemented in an arbitrary order, except as expressly described by "earlier", "in advance of", and the like, or except in the case of using an output of a previous processing in the subsequent processing. Any use of "first", "next", "subsequently", "then", and the like for convenience of illustration as to the operation flows in the claims, the specification, and the drawings does not indicate that the processing is to be preferably executed in this order.

The invention claimed is:

1. A numerical control apparatus configured to control a machine tool, the numerical control apparatus comprising:
   a storage configured to store unique information unique to the numerical control apparatus or an operator;
   a receiving part configured to receive a machining program including incidental information, the incidental information including information unique to the numerical control apparatus or the operator capable of executing the machining program;
   a determination part configured to check the incidental information included in the machining program received by the receiving part against the unique information stored in the storage, and determine whether information matching the unique information is included in the incidental information; and
   a machine controller configured to execute the machining program received by the receiving part so as to control the machine tool, only when it is determined that the information matching the unique information is included in the incidental information.

2. The numerical control apparatus according to claim 1, wherein the unique information includes:
a device-unique number uniquely assigned to the machine tool or the numerical control apparatus;
an operator-unique number uniquely assigned to the operator;
tool information indicative of information on a tool to be used in the machine tool; or
workpiece information indicative of information on a workpiece to be machined by the machine tool.

3. The numerical control apparatus according to claim 2, wherein the unique information includes the operator-unique number,
wherein the numerical control apparatus further comprises an input part for the operator-unique number,
wherein the storage stores the operator-unique number input to the input part.

4. The numerical control apparatus according to claim 1, wherein the receiving part receives the machining program transmitted from an external device via a network.

5. The numerical control apparatus according to claim 1, wherein the receiving part receives the machining program stored in an external memory detachably attached to the numerical control apparatus.

6. The numerical control apparatus according to claim 1, further comprising an alarm generation part configured to generate an alarm, when the determination part determines that the information matching the unique information is not included in the incidental information.

7. A method of controlling a machine tool by a numerical control apparatus, the method comprising:
receiving a machining program including incidental information, the incidental information including information unique to the numerical control apparatus or the operator capable of executing the machining program;
checking the incidental information included in the received machining program against unique information which is stored in the numerical control apparatus and which is unique to the numerical control apparatus or the operator, and determining whether information matching the unique information is included in the incidental information; and
executing the received machining program so as to control the machine tool, only when it is determined that the information matching the unique information is included in the incidental information.

8. A computer program causing the numerical control apparatus to execute the method according to claim 7.

* * * * *